April 27, 1937.   C. HART   2,078,494
WROUGHT IRON AND METHOD
Filed April 28, 1934   2 Sheets-Sheet 2

Witnesses:

Inventor
Charles Hart,
By
Attorney.

Patented Apr. 27, 1937

2,078,494

UNITED STATES PATENT OFFICE 2,078,494

WROUGHT IRON AND METHOD

Charles Hart, Media, Pa., assignor of one-half to Martin J. Conway, Coatesville, Pa., and one-fourth to William Steell Jackson, Bala-Cynwyd, Pa.

Application April 28, 1934, Serial No. 722,981

12 Claims. (Cl. 75—47)

My invention relates to methods for preparing wrought iron containing chromium oxide in effective quantity and to a novel wrought iron product containing effective amounts of chromium oxide.

A purpose of my invention is to increase the resistance to corrosion of wrought iron by incorporating in the iron a special slag having corrosion resisting properties.

A further purpose is to incorporate into wrought iron a slag containing chromium oxide in effective quantity.

A further purpose is to boil puddling furnace slag very thoroughly in contact with iron containing alloying ingredients, as for example, chromium, tungsten, manganese, nickel, copper, vanadium, titanium, cobalt, molybdenum.

A further purpose is to incorporate a slag containing corrosion resisting ingredients in wrought iron alloyed with metals such, as chromium tungsten, manganese, nickel, copper, vanadium, titanium, cobalt, molybdenum.

A further purpose is to thoroughly boil such a corrosion resisting slag in contact with iron partially protected from corrosion by alloying ingredients.

A further purpose is to duplex wrought iron, purifying the iron while obtaining a substantially cast iron carbon content in a first furnace, introducing alloying ingredients into the iron, and puddling the iron containing the alloying ingredients in contact with a slag, whether the original iron silicate slag or a special slag.

A further purpose is to puddle iron in contact with a slag containing the oxides of one or more metals, and with a reducing agent effective to reduce one or more of the metals to alloy with the iron while leaving part of the metal or some of the metals unreduced to enter the slag.

A further purpose is to granulate iron, whether with or without alloying ingredients, and to pour it into slag containing chromium oxide.

My invention involves the methods employed and the product obtained.

In the drawings I show only a few of the many forms of apparatus which might be used, choosing them from the standpoint of convenience in illustration, simplicity in construction and satisfaction in operation.

In the drawings like numerals refer to like parts.

Figure 1:
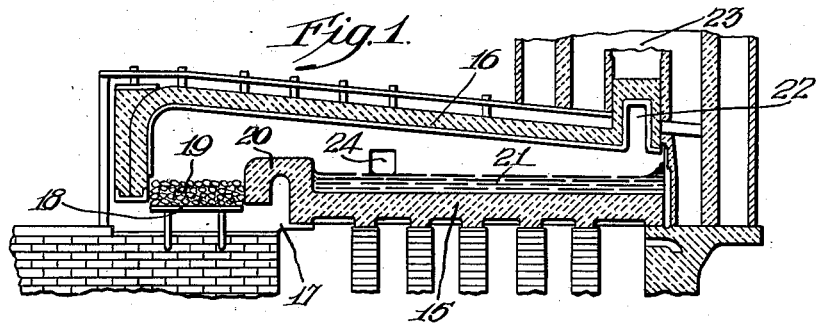
Figure 1 is a central vertical section, largely diagrammatic, of a hand puddling furnace.

In the past, wrought iron has frequently been employed in spite of its greater expense, to replace steel in structures subjected to corrosion. This greater resistance to corrosion is assumed to be due to the protection of the slag coating which surrounds the wrought iron fibers.

For numerous uses, however, the corrosive resistance of wrought iron has been found to be inadequate. For example, in oil refineries, in general piping, in chemical industries, in retorts and reaction vessels, and in storage tanks for corrosive chemicals and similar materials, wrought iron has had limited life, and has corroded so quickly that much more expensive materials have been required.

To remedy the situation it has been proposed to alloy wrought iron with other metals, which, from experience in the manufacture of steel, are known to increase the resistance to corrosion. For example, Aston, in United States Patent 1,492,412, granted April 29, 1924, for "Alloy wrought iron and method of making the same", proposes to granulate a steel containing copper, vanadium, nickel, titanium, chromium or manganese, and mix the granulated steel with a slag according to his well known process.

Resistance to corrosion is influenced by at least three factors: (1) the character of the iron; (2) the character of the slag; (3) the extent of covering of the iron fibers by the slag. Aston attacks the problem from the standpoint of the first of these, i. e., by alloying the iron with a metal which will increase the resistance to corrosion. This is undoubtedly a forward step. Aston pays no attention to the character of the slag, and evidently proposes to use an iron silicate slag such as is suggested in his other patents. In mixing the iron with the slag, Aston merely pours the granulated iron into the slag. He makes no use of the ebullition of gases, as for example from a boil, to incorporate the slag into the iron by folding the metal over itself as it becomes increasingly more viscous.

I have discovered that the resistance of wrought iron to corrosion may be further increased by attention to the last two factors. I incorporate into the wrought iron a slag having higher corrosion resisting qualities than the ordinary iron silicate slag, and I am careful to have this slag very thoroughly intermingled with the iron fibers to shield them. Accordingly, I may make the metal itself more corrosion resisting by introducing alloying ingredients, but I do not rely upon this alone, to accomplish the increase in resistance to corrosion.

At the time of filing this application the slag incorporated into wrought iron had a typical composition approximately as follows:

Silica 16-20%; alumina 4-6%; manganese dioxide 3%; phosphorous pentoxide 1%; ferrous oxide 70-76%.

I propose to introduce into the slag present in the wrought iron a small amount of chromium oxide. I find by actual experiment that the introduction of chromium into the slag increases the effectiveness of the slag in protecting the metal from corrosion.

For example, in a test made using hydrochloric acid, a sample protected by the presence of chromium oxide in the slag was not corroded in the time in which an ordinary sample of wrought iron was seriously attacked.

The amount of chromium oxide in the slag should be sufficient to give a chromium content for the muck bar (metal and slag) of 0.10%; 0.30% or preferably 0.50% chromium. I find that less than 0.05% of chromium as chromium oxide is not effective to produce any noticeable corrosion-resisting properties. As much as 1.00% of chromium as chromium oxide may be employed.

In Figure 1 I show a typical hand puddling furnace. The hearth 15 for holding the metal may be lined with any suitable refractory material such as calcined magnesite and then covered with fettling. The furnace is roofed as at 16 with suitable refractory material.

Air is drawn through the opening 17, either directly from the atmosphere or preheated as desired, and is carried through the grate 18 and the coal fire 19 over the bridge wall 20 and above the charge 21. After the products of combustion have passed over the charge they are led through the flue 22 and up the stack 23. The charge may be worked through the work door 24 at the side of the furnace.

It will be understood that the structural details of the puddling furnace of Figure 1 are not important, since I might equally well carry out my process in any other suitable furnace.

Any suitable raw material, as for example cast iron, is charged into the furnace. The metal may be charged cold and melted in the furnace, or may be charged molten.

Having melted the charge, if it were cold, the charge is cleared of its impurities, including manganese and silicon. Then phosphorus is ordinarily removed at a suitably low temperature, and finally carbon is oxidized. The oxidation of carbon is accomplished by a violent ebullition of gases commonly referred to as the "boil".

I will ordinarily remove a slag prior to the boil, and introduce other slagging ingredients so that a slag of the desired composition will become thoroughly mixed with the iron during the boil.

When new slag ingredients are added, they will include chromium oxide with permissibly oxides of other metals which I desire to incorporate into the iron.

Figure 2:
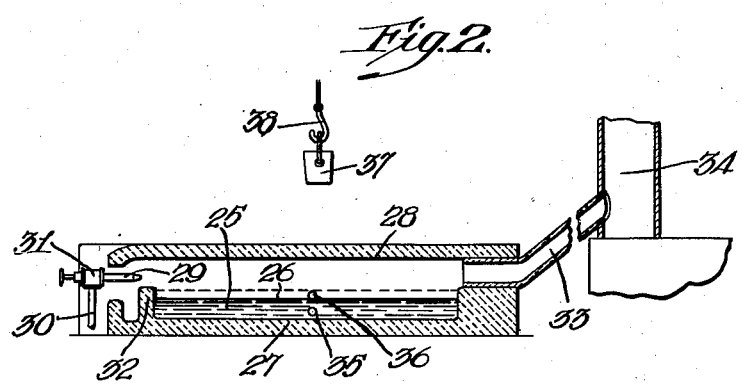
Figure 2 is a diagrammatic central vertical section of a clearing furnace of the type which I use in the duplex manufacture of wrought iron.

In Figure 2 I show a clearing furnace which may be desirably used in the duplex manufacture of special wrought iron. The furnace of Figure 2 may be desirably of shallow acid bath reverberatory type. The iron bath 25 covered by the slag 26 lies on the hearth supported by the lining 27 preferably of silica brick or other refractory which will stand up under acid conditions.

For convenience the roof 28 will ordinarily be made of magnesite or high grade fire brick. The furnace will be fired in any suitable manner, as for example by the oil jet 29 supplied from a pipe 30 controlled by a valve 31. Air is drawn into the furnace around the jet 29, and, mixing with the fuel, carries the flame over the bridge wall 32 and above the bath.

The entering air could of course be preheated. After passing over the bath the products of combustion are carried by the flue 33 to the stack 34.

The furnace is provided with a tap opening 35 for the iron and a tap opening 36 for the slag.

Figure 3:
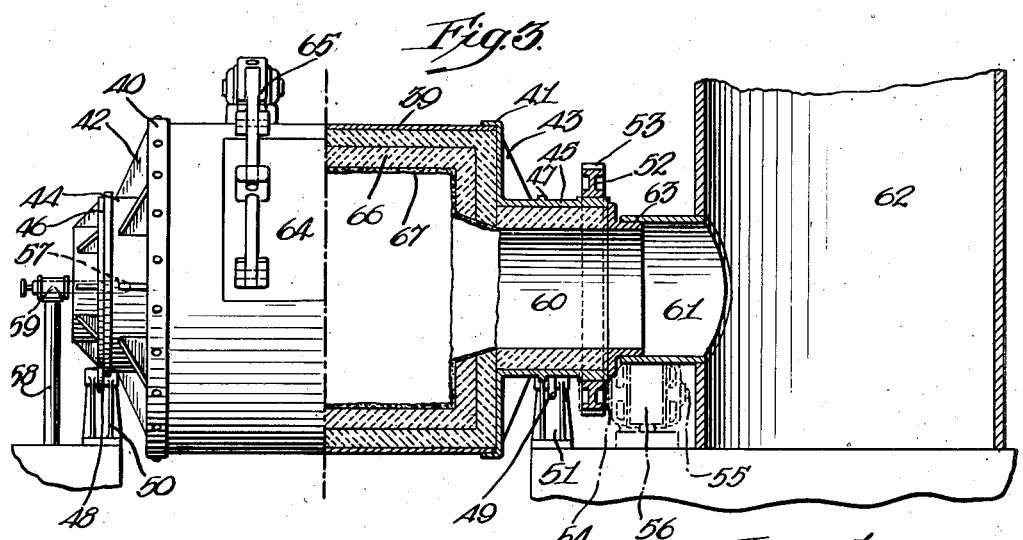
Figure 3 shows in side elevation, half section, a conventional mechanical puddling furnace which may be employed, either to perform the entire puddling operation or as a second furnace in duplexing wrought iron which has been treated in a furnace of the type of Figure 2.

The furnace of Figure 3 will ordinarily be used in conjunction with that of Figure 2. Metal from the furnace of Figure 2 will be transferred to the puddling furnace in any suitable manner, as for example by a ladle 37 supported on the hook 38 from a crane.

The furnace of Figure 3 comprises generally an external metallic casing 39 supported at either end by the heads 40 and 41, braced at 42 and 43 from the hubs 44 and 45.

The hubs carry bands 46 and 47 which rest in and rotate or oscillate upon rollers 48 and 49 in supports 50 and 51, so that the furnace may be rotated or oscillated in either direction as desired. The hub 45 also supports a driving band 52, having gear teeth 53 engaging the driving gear 54 on the shaft 55 of the motor 56, to turn the furnace.

Suitable gaseous or liquid fuel is admitted through the burner 57 from the pipe 58, controlled by the valve 59. Air is drawn in around the burner. The products of combustion from the furnace discharge through the neck 60 into the flue 61 and up the stack 62. The flue and the neck are desirably sealed as at 63 in any suitable manner so that the furnace may rotate or oscillate without excessive loss of draft.

For charging and discharging, the furnace has a door 64, which will very desirably be mechanically controlled by mechanism 65 not indicated in detail on the drawings as not important to this invention.

The refractory lining 66 covers the interior of the furnace body 39. The refractory will ordinarily be covered with a fettling lining 67.

It will be understood that the description herein recited of the mechanical details of the furnace structure is entirely irrelevant to my invention and is given simply to make clear the drawings which I show of my best form.

In the duplex process, the raw material will ordinarily be cast iron which may be charged molten directly from a blast furnace or a holding furnace, or which may be charged in solid form and melted in the preliminary clearing furnace. The preliminary furnace should contain a predominantly acid slag, which will assist in the removal of manganese and silicon under quiescent shallow bath conditions. After the manganese and silicon are removed to the extent desired, the metal from the preliminary clearing furnace is separated from the slag of the preliminary clearing furnace and taken to the basic mechanical puddling furnace in which a "bottom" has previously been made up.

The molten manganese- and silicon-cleared iron in the mechanical puddling furnace is preferably held at a low temperature to assist the removal of phosphorus. After sufficient phosphorus has been removed, the mechanical puddling furnace is violently agitated by rotation or oscillation of the furnace and the temperature is raised to produce a boil. During the boil, the oxidation of the carbon violently agitates the metal and mixes it up very thoroughly with the slag. With the removal of carbon the melting point of the metal rises and the metal becomes progressively more pasty, until eventually a semi-solid "ball" remains.

The ball is separated from the excess of puddling furnace slag and then carried to the squeezer and rolling mill as in conventional puddling practice.

In making up the "bottom" for the puddling furnace, I will preferably add chrome ore to such an extent that the resulting muck bar will have from at least 0.05% of chromium as chromium oxide. In case it is not desired to add the chrome ore or other source of chromium oxide at the time that the "bottom" is made up, I may introduce the chrome ore just before the boil and after the removal of phosphorus. In this case, I may either retain the phosphorus clearing slag, or separate it and make up a new bottom in which the chrome ore is incorporated.

Figure 4:
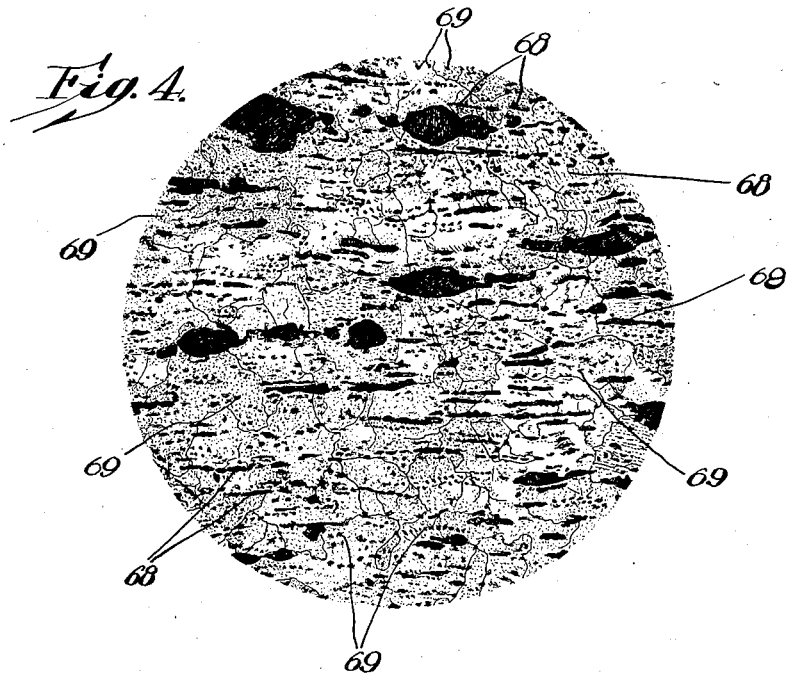
Figure 4 is a photomicrograph of a specimen of wrought iron prepared by my process.

In any case, the chromium oxide should be in contact with the metal before the boil as the boil serves to incorporate the chromium oxide slag very thoroughly in the metal, producing a resultant muck bar structure as shown in Figure 4. In Figure 4, there are numerous threads of slag 68 in the plane of the section of the photomicrograph, as well as numerous other threads of slag 69 (which appear as dots) transverse to the plane of the section of the photomicrograph.

Advantage may be taken of my invention in the hand puddling furnace by introducing chromium into the slag preferably just previous to the boil. In hand puddling practice, it is best to separate the manganese- and silicon-clearing slag before the removal of phosphorus and to introduce chromium oxide into the new slag made up for phosphorus removal or into a special slag made up after separation of the phosphorus-clearing slag before the boil.

While I consider that boiling of the metal in contact with the chromium oxide slag is highly important, some advantage may be obtained from my invention by placing chromium oxide in the slag used in the Aston process, granulating the iron and pouring it into the slag or otherwise suitably mixing the slag with the iron.

While it is by no means necessary in my invention and while I have obtained good experimental results with wrought iron having chromium present entirely as chromium oxide in the slag, I may also incorporate alloying ingredients into the wrought iron, in addition to the chromium oxide in the slag.

Such alloying additions may be introduced in the form of ferro alloys of the alloying material, preferably added just previous to the boil in the hand or mechanical puddling furnace, or may be reduced from their oxides by suitable reducing agents such as carbon, ferro-silicon, etc.

For example, if it is desired to have chromium as an alloying ingredient in the iron, as well as chromium oxide in the slag, a relatively large amount of chrome ore should be introduced into the puddling furnace with enough reducing agent to accomplish partial reduction, leaving enough chromium oxide unreduced in the slag to produce a muck bar having at least 0.05% of chromium as chromium oxide.

In addition to chromium, I may introduce into the metal other alloying ingredients such as tungsten, manganese, nickel, copper, vanadium, titanium, cobalt, molybdenum. I find that it is advantageous to incorporate such alloying ingredients into the metal and subsequently to boil the metal vigorously, even where chromium oxide is not introduced into the slag, because there is a tendency in the Aston process to produce wrought iron in which the slag is not as thoroughly incorporated with the alloyed iron as might be desired due to the absence of a boil.

To obtain the best use of my invention, the iron after it has been purified and is ready to begin to boil should contain a considerable part of its original cast iron carbon content. The carbon content at the beginning of the boil should in any case be not less than 1%, and the iron will preferably have 2 or 3% of carbon.

It will be evident that production of corrosion-resisting wrought iron by incorporating chromium oxide in the slag is much cheaper than accomplishment of the same result by introducing chromium as an alloying ingredient into the iron, because reducing agents are not required and the cheapest source of chromium possible, chrome ore, may be introduced directly into the furnace.

Of course, the best possible condition regarding corrosion resistance, although not the cheapest, is one in which corrosion-resisting alloying elements are present in the iron, in addition to chromium oxide in the slag, and the slag is thoroughly mixed with the iron by a vigorous boil, preferably accompanied by the mechanical mixing of mechanical puddling.

I have specified the chromium oxide content of the slag in terms of the chromium present as chromium oxide in the muck bar because, from the standpoint of chemical analysis, it is much easier to determine chromium (and calculate to chromium oxide) for the muck bar than to determine chrome in the slag, which occurs in such minute threads that it is difficult to obtain a sample for analysis. After determining the total amount of chromium in the muck bar, the chromium present as chromium oxide may be determined from this, knowing the amount of chromium, if any, in the iron.

These results may be checked by analysis of the "press cinder", that is, the slag removed from the iron by the squeezer. This will ordinarily contain more than 2% and preferably 5% or more of chromium oxide.

Where chromium is to be introduced as an alloying ingredient into the iron, the quantity of chromium should preferably vary from 0.5% to 10%. Generally 2% to 5% of chromium will be satisfactory for alloying purposes. Much higher chromium contents may be employed under special conditions.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. In the manufacture of wrought iron, the method which consists in removing manganese and silicon under quiescent acid conditions, in separating the manganese- and silicon-clearing slag, in introducing, into the iron, chromium and an alloying ingredient of the class comprising tungsten, manganese, nickel, copper, vanadium, titanium, cobalt and molybdenum and in boiling the iron due to oxidation of more than 1% of carbon in contact with puddling slag, containing sufficient chromium oxide to produce a muck bar having more than 0.05% of chromium as chromium oxide.

2. In the manufacture of wrought iron, the steps which consist in reducing an alloying ingredient oxide in contact with the iron to introduce the alloying ingredient into the iron and in boiling the alloyed iron containing more than 1% of carbon at the beginning of the boil in contact with a slag containing sufficient chromium to give more than 0.05% of chromium as chromium oxide in the muck bar.

3. In the manufacture of wrought iron, the steps which consist in reducing chromium oxide in the presence of the iron to introduce chromium into the iron, the reduction being regulated to leave enough unreduced chromium in the iron to give a muck bar containing more than 0.05% of chromium as chromium oxide and in boiling the alloyed iron in contact with a slag containing chromium oxide in sufficient quantity to give a muck bar containing more than 0.05% of chromium as chromium oxide.

4. A muck bar containing an alloying ingredient in the iron which renders the iron more resistant to corrosion and more than 0.05% of chromium as chromium oxide.

5. A muck bar containing chromium alloyed with the iron and more than 0.05% of chromium as chromium oxide, whereby the chromium alloyed with the iron and the chromium oxide each contributes to rendering the muck bar more resistant to corrosion.

6. The method of producing wrought iron having increased corrosion resisting properties, which consists in adding chromium oxide to the iron, in reducing sufficient chromium from the chromium oxide to alloy between 0.5% and 10% of chromium with the iron, in retaining sufficient chromium oxide in a slag in contact with the iron to leave more than 0.05% of chromium as chromium oxide in the muck bar and in incorporating the slag with the iron.

7. The method of producing wrought iron having increased corrosion resisting properties, which consists in adding chromium oxide to the iron, in reducing sufficient chromium from the chromium oxide to alloy between 0.5% and 10% of chromium with the iron, in retaining sufficient chromium oxide in a slag in contact with the iron to leave more than 0.30% of chromium as chromium oxide in the muck bar and in incorporating the slag with the iron.

8. The method of producing wrought iron having increased corrosion resisting properties, which consists in adding chromium oxide to the iron, in reducing sufficient chromium from the chromium oxide to alloy between 0.50% and 10% of chromium with the iron, in retaining sufficient chromium oxide in a slag in contact with the iron to leave more than 0.05% chromium as chromium oxide in the muck bar, in alloying with the iron a metal of the class comprising tungsten, manganese, nickel, copper, vanadium, titanium, cobalt and molybdenum and in incorporating the slag with the iron.

9. The method of producing wrought iron of high corrosion resistance, which consists in refining pig iron, in removing the refining slag, in adding to the iron a new slag containing chromium oxide, in introducing sufficient reducing agent to reduce part only of the chromium oxide and in thoroughly mixing the chromium oxide with the iron, the quantity of chromium oxide and the parts thereof reduced and unreduced bearing such relation to the iron that the muck bar contains from 0.5% to 10% chromium as chromium and more than 0.05% chromium as chromium oxide.

10. The method of producing wrought iron of high corrosion resistance, which consists in refining pig iron, in removing the refining slag, in adding to the iron a new slag containing chromium oxide, in introducing sufficient reducing agent to reduce part only of the chromium oxide and in thoroughly mixing the chromium oxide with the iron, the quantity of chromium oxide and the parts thereof reduced and unreduced bearing such relation to the iron that the muck bar contains from 0.5% to 10% chromium as chromium and about 0.50% chromium as chromium oxide.

11. Wrought iron of higher corrosion resistance than typical wrought iron having a content of metallic chromium between 0.5% and 10% and a content of chromium as chromium oxide in excess of 0.05%, both the metallic chromium and the chromium oxide contributing to the corrosion resistance.

12. Wrought iron of higher corrosion resistance than typical wrought iron having a content of metallic chromium between 0.5% and 10% and a content of chromium as chromium oxide of about 0.50%, both the metallic chromium and the chromium oxide contributing to the corrosion resistance.

CHARLES HART.